United States Patent
deBry et al.

(10) Patent No.: US 6,538,760 B1
(45) Date of Patent: Mar. 25, 2003

(54) METHOD AND APPARATUS FOR GENERATING A PRODUCTION PRINT STREAM FROM FILES OPTIMIZED FOR VIEWING

(75) Inventors: Roger K. deBry, Orem, UT (US); David E. Stone, Longmont, CO (US); Reinhard H. Hohensee, Boulder, CO (US); Dwight R. Palmer, Longmont, CO (US); Arthur R. Roberts, Boulder, CO (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/149,341

(22) Filed: Sep. 8, 1998

(51) Int. Cl.[7] .............................. G06F 3/12; G06F 13/00
(52) U.S. Cl. ...................... 358/1.15; 358/1.14; 358/1.13
(58) Field of Search ............................... 358/1.15, 1.13, 358/1.17, 1.16; 707/103, 102, 527, 526, 542, 517

(56) References Cited

U.S. PATENT DOCUMENTS

| | | | |
|---|---|---|---|
| 5,684,934 A | * 11/1997 | Chen et al. | ................. 395/113 |
| 5,768,488 A | 6/1998 | Stone et al. | |
| 5,982,997 A | * 11/1999 | Stone et al. | ................. 395/114 |
| 5,987,226 A | 11/1999 | Ishikawa et al. | |
| 6,067,553 A | * 5/2000 | Downs et al. | ............... 707/523 |
| 6,067,554 A | * 5/2000 | Hohensee et al. | ........... 707/527 |
| 6,115,132 A | 9/2000 | Nakatsuma et al. | |
| 6,173,289 B1 | 1/2002 | Sonderegger et al. | |
| 6,188,487 B1 | 2/2002 | Matsubara | |

* cited by examiner

Primary Examiner—Joseph Mancuso
Assistant Examiner—Douglas Tran

(57) ABSTRACT

A conversion program selectively decomposes viewable files, such as PDF files, and generates a print-structured, bi-directional stream composed of print data objects, resource objects and command objects. The conversion program uses a mapping table to determine which resources have already been sent to the printer so that redundant resources are not re-sent to the printer. The resources and page data for each page are assembled in order and sent to the printer so that the resources necessary to render a page precede the page data. In this manner the printer always has the resources necessary to print each page. The print data, resource and command objects are sent from a print server which controls the print system to a printer by means of a containerized data stream which is bi-directional. A reply object is used to provide information concerning processing of the data from the print server to the printer.

30 Claims, 10 Drawing Sheets

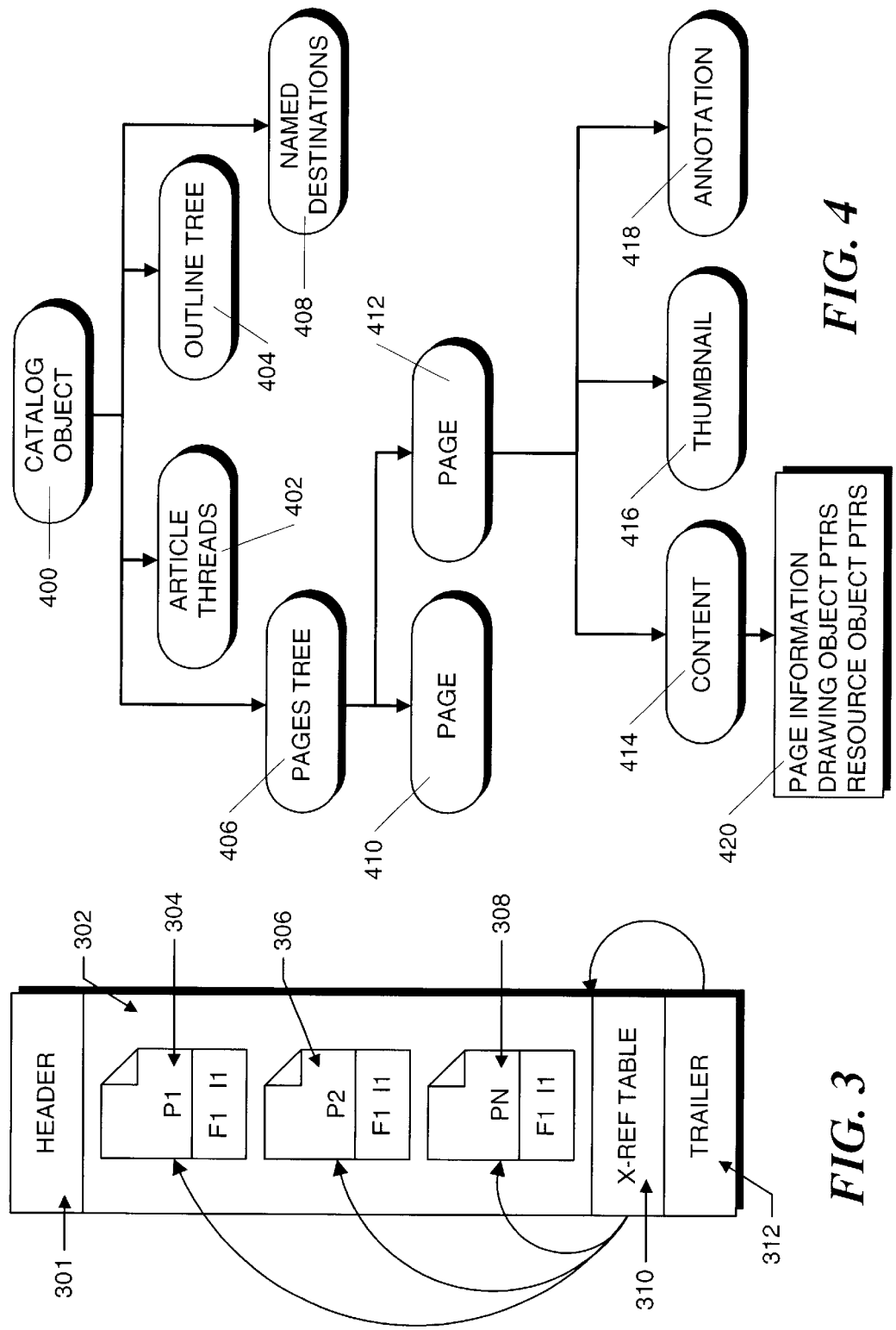

METHOD AND APPARATUS FOR GENERATING A PRODUCTION PRINT STREAM FROM FILES OPTIMIZED FOR VIEWING

FIELD OF THE INVENTION

This invention relates generally to high-speed, high-volume production printing systems and, more particularly, to using such systems to print documents containing data which has been designed for viewing and other purposes.

BACKGROUND OF THE INVENTION

Computer systems can generate output information in several ways, including video output and "hard copy" or printed output. Although more and more output consists of evanescent video screens, a large amount of data is still printed on paper and other permanent media. Therefore, there is a need for efficiently describing printed data and then printing a hard copy page from the print description. The printing is often performed by high-speed, high-volume printing systems which receive streams of encoded print data and utilize "intelligent" printers that can store commands and data. Such encoded print streams often include data for many printed pages. For example, a telephone company might print all of its telephone bills for a specified week with a single print stream. Each page in the print stream may be a telephone bill for a particular customer.

There are several well-known prior art encoding systems which have been designed to efficiently accomplish different objectives. Generally, a print data stream is encoded by means of a page description language which describes the format of each page. There are several conventional page description languages. One of these is called POSTSCRIPT® which is a print document description language which has been developed by the Adobe Corporation, San Jose, Calif. A POSTSCRIPT® encoded document includes a file containing page description commands or "operators." The POSTSCRIPT® operators describe how each page in the document is composed. A single POSTSCRIPT® file can generate a multi-page document because each page is composed according to the operators in the file.

One problem with documents described using POSTSCRIPT® is that it is not possible to examine a POSTSCRIPT® encoded document and ascertain where a particular page begins and ends without starting at the beginning of the document and calculating where each page break occurs. Therefore, documents encoded in the POSTSCRIPT® language are difficult to view on a display screen because the pages cannot be displayed in a random order. Further, if an error occurs during printing, it may be difficult to restart the printer at any place except the beginning of the document. This inability to restart and reposition the print stream can be a major problem in a production printing system where each print run can be thousands of pages.

In order to overcome some of the difficulties with viewing POSTSCRIPT®, another page description language was developed by the Adobe Corporation called the Portable Document Format (PDF) language. PDF is a file format which describes a group of pages to be viewed and uses graphic operators which are similar to POSTSCRIPT® operators to describe the page format. The PDF format was originally designed to view documents and the Adobe Corporation distributes a product which converts printable POSTSCRIPT® files into PDF format to allow the files to be efficiently viewed.

A PDF file actually defines single pages that can be viewed and printed separately. A PDF file is constructed with a header, a trailer, a cross reference table and a body. Page objects containing information for each page are located inside the body, in random order, and resource objects containing resource information are also located inside the body. The trailer portion of the file contains a pointer to the cross reference table and the cross reference table indexes the various page and resource objects. Since the cross reference table is referenced by the trailer, the file can be generated by a one pass operation. In addition, viewing the pages in any order is straightforward. Specifically, in order to view a page, the trailer in the PDF file is first located to obtain the pointer to the cross reference table. Once the cross reference table is located then the index to a particular page can be obtained.

While viewing a PDF file is straightforward, printing with this format is not optimum because the trailer must be located before printing of the file can start. Since the file trailer is at the end of the file, the entire file must be loaded before printing can start. If the file is large, a substantial amount of memory is required. In addition, each page may also contain resources files, such as fonts and bitmaps, which may be referred to in the file at various locations. Therefore, the resources must also be loaded prior to printing.

In order to reduce the time delay caused by the necessity to load the entire file, the Adobe Corporation revised the PDF format into a "linearized" version in which the page data and resources for the first page are located at the beginning of the file so that the first page can be viewed while the remainder of the file is being loaded.

Although effective for viewing, this file format is not adequate for high speed production printing, where the printer expects a linear stream of page data with resources either in-line or already pre-stored in the printer. Since the PDF format was not designed for driving a printer, it does not incorporate any of the necessary mechanisms to carry on a two-way communication between a printer and a printer server that is necessary to manage high speed production printing operations. These operations include, but are not limited to, effective page level error recovery, operator repositioning, resource management, external formatting, and error reporting.

In order to print documents in PDF format, many prior art systems transform the PDF format document into a POSTSCRIPT® format document and then print the POSTSCRIPT® format document. As mentioned above, the POSTSCRIPT® format does provide for the linear streaming of the print data as required for production print streams, but the format does not provide any of the key mechanisms described above which allow the two-way communication required for high speed production printing environments.

Another page description language is known as MO:DCA™ (Mixed Object Document Content Architecture), described in detail in I.B.M. Mixed Object Document Content Architecture Reference number SC31-6802. This language has the characteristic that page information is stored in the order that it is printed so that file processing can begin as soon as the information for the first page is located. During file construction, common resources, such as fonts, are removed from the print data and stored in a separate resource database. A reference is placed in the print file to refer to the stored resource.

The MO:DCA file format is designed to be used with a printing system known as the "Advanced Function Presentation" (AFP) printing system developed by, and available from, International Business Machines Corporation, Armonk, N.Y. This printing system has an intelligent print server which receives the print data and uses the references in the data stream to retrieve the stored resources from the resource database. The resources are then downloaded to the printer ahead of the data. At the printer the resources are combined with the print data and sent to a rasterizer for printing.

The MO:DCA file format has the advantage that pages can easily be located in the data stream because the page information is stored in the order that it will be printed. Also, each page contains an "Active Environment Group" definition that specifies the resources that are required to print the page. In addition, if an error occurs during printing, it is possible to restart the printing process from the last page printed rather than from the beginning of the file. However, the AFP system only provides these advantages with the "native" MO:DCA file format and "native" objects contained therein. It does not provide the same level of recovery with other, "non-native", file formats, such as the PDF file format discussed above.

Therefore, it would be desirable to convert file formats which are originally designed for viewing, such as the PDF file formats, into a print stream which is efficient for production printing and supports a bi-directional data and command flow between a production printer and a print system.

SUMMARY OF THE INVENTION

In accordance with the principles of the invention, a conversion program selectively decomposes viewable data, such as a PDF file, and generates a print-structured, bi-directional stream composed of print data objects, resource objects and command objects. The conversion program uses a mapping table to determine which resources have already been sent to the printer so that redundant resources are not sent to the printer.

The print data, resource and command objects are sent from a print server which controls the print system to a printer by means of a containerized data stream such as the Intelligent Printer Data Stream™ which is bi-directional.

BRIEF DESCRIPTION OF THE DRAWINGS

The foregoing and other objects and advantages of the invention will be appreciated more fully from the following further description thereof with reference to the accompanying drawings wherein:

FIG. 3 is a schematic diagram illustrating the internal structure of a conventional PDF file.

FIG. 4 is a block schematic diagram illustrating the contents of a catalog object in the PDF file.

DETAILED DESCRIPTION OF ILLUSTRATIVE EMBODIMENT

Figure 1:
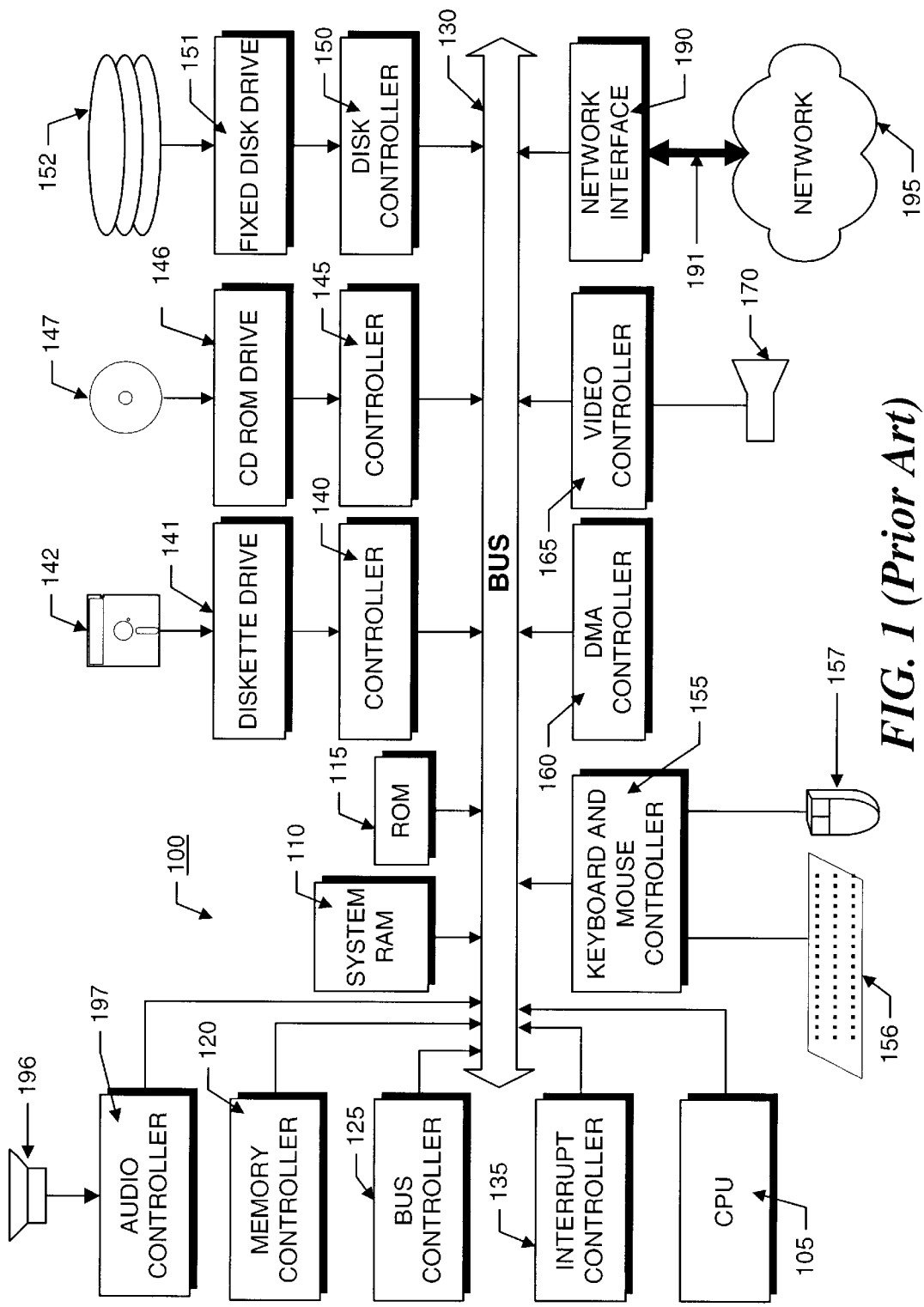
FIG. 1 illustrates the system architecture for an conventional exemplary computer system on which the preferred embodiment of the invention can be implemented.

FIG. 1 illustrates the system architecture for an exemplary client computer 100, such as an IBM THINKPAD 701® computer, on which the disclosed printing system can be implemented. The exemplary computer system of FIG. 1 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 1.

The client computer 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the client computer 100 may be provided by a number of devices. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Client computer 100 also includes a network adapter 190 that allows the client computer 100 to be interconnected to a network 195 via a bus 191. The network 195, which may be a local area network (LAN), a wide area network (WAN), or the Internet, may utilize general purpose communication lines that interconnect a plurality of network devices.

Client computer system 100 generally is controlled and coordinated by operating system software, such as the WINDOWS 95® operating system (available from Microsoft Corp., Redmond, Wash.) or WINDOWS NT® operating systems (available from Microsoft Corp., Redmond, Wash.) or the AIX® operating system (available from International Business Machines Corporation, Armonk, N.Y.) Among other computer system control functions, the operating system controls allocation of system resources and performs tasks such as process scheduling, memory management, networking and I/O services.

Figure 2:
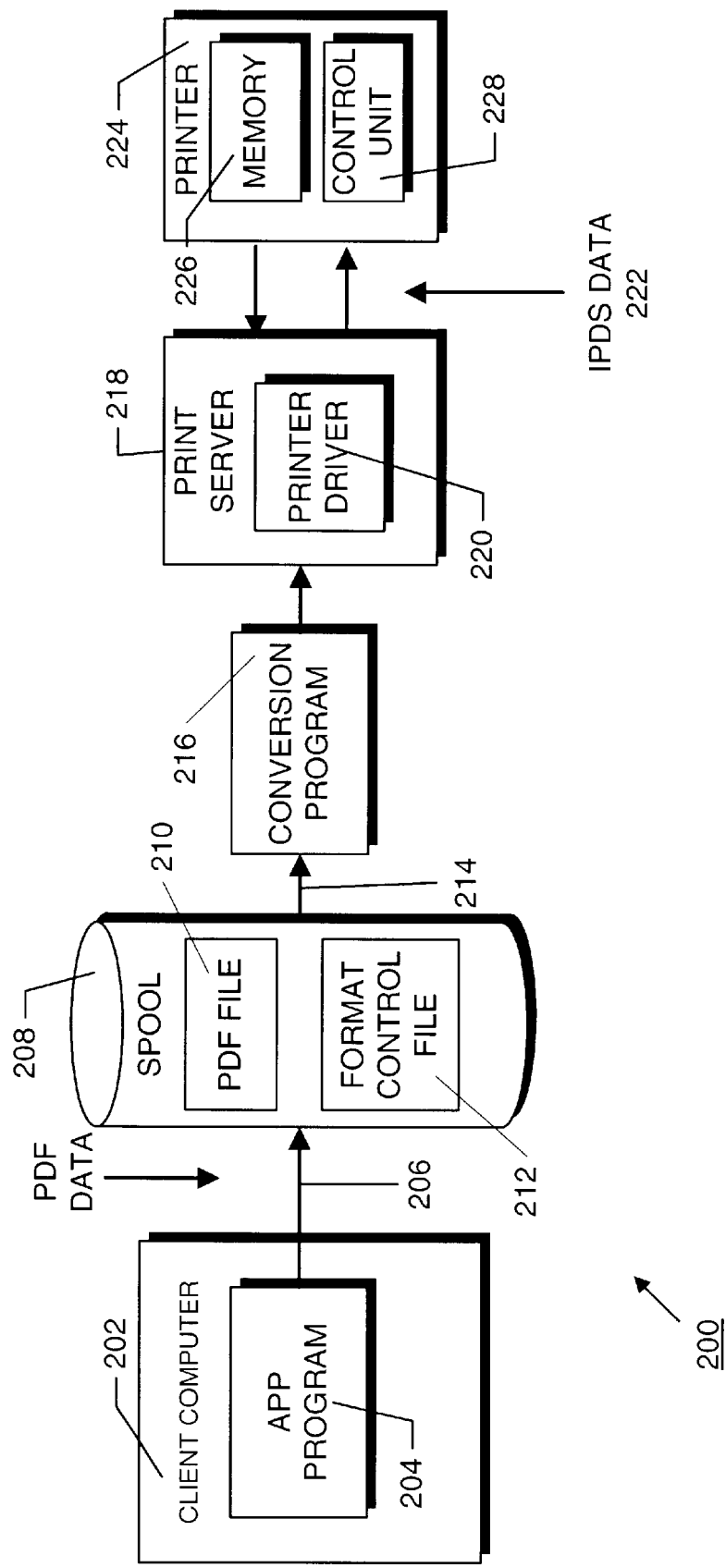
FIG. 2 is a schematic drawing of an illustrative production printing system which uses a conversion program operating in accordance with the principles of the invention.

FIG. 2 illustrates a production printing system 200 for printing a viewable document produced by an application program 204 on a client computer 202. The client computer 202 may be a conventional personal computer, such as that described above. The application program 204 running on the computer 202 generates a viewable data stream 206 that contains page description information. For example, the viewable data stream might be a PDF file.

The data stream 206 is stored in spool 208. Resources used for viewing each page would also be carried in the actual file and be stored in the spool 208. The spool 208 both stores and spools the viewable file 206 from the application program 204 in a PDF format 210. Spool 208 may also store other information such as formatting control information 212 that can be used to perform additional formatting on the print data. Such additional formatting, after it is transformed to a print stream may, for example, be "n-up" formatting or some similar processing which is performed on the data stream prior to printing.

The spooled output data stream 214 is transmitted to a conversion program 216 which generates an output data stream which is a formatted, platform, device and resolution independent, logical description of the print document. The conversion program 216, which will be further described in detail below, generates a logical description of the document with references to resource information that is necessary to print the document pages. For example, such a logical description of a data stream utilized for printing in a production printing system, such as the AFP system, can be the aforementioned MO:DCA file format. Other file formats can also be used.

A print server 218 that converts the device-independent print specifications to a device specific data stream by means of a printer driver. In the case where the MO:DCA printing format is used, the resulting data stream 222 called an Intelligent Printer Data Stream™ (IPDS™, trademark of IBM Corporation, Armonk, N.Y.) is sent to the printer 224.

Printer 224 has a control unit 228 with which print server 218 can communicate and an internal memory 226. The communication between the print server 218 and the printer is bi-directional. For example, print server 218 may inquire of printer 224 whether a particular resource, such as a font, is resident in the printer memory 226. If the resource is not present, print server 218 can retrieve the font from a resource database and download it using data stream 222 into printer memory 226. The resource will then be available for future use. Subsequently, when print data that refers to the downloaded resource is received by the printer 224, the printer 224 will combine the resource with the data and provide the combination to a conventional Rasterizing Image Processor (called a "RIP", not shown in FIG. 2) which converts the data into a printable graphic image.

In the description that follows, a PDF file objects will be used as an example of a viewable file format which can be converted to a production print stream with the apparatus and method of the present invention. However, it should be understood that other viewable file formats can be similarly converted to generate the desired production print stream. FIG. 3 shows, in more detail, the internal organization of a PDF print object 300. The object 300 consists of a header 301, a body 302, a cross reference table 310 and a trailer 312. The trailer 312 identifies the location of the cross reference table 310 and the cross reference table 310 contains indices which refer to page body data for each of the separate pages located in the object body 302. The data for each page includes the actual page data P1 and may also include resources such as a font F1 or an image I1. In the particular PDF file 300 shown in FIG. 3, there are three pages, 304, 306 and 308. Each of these pages includes page data, P1, P2 and PN, but also each page requires the same font resource data F1 and the same image I1.

Among the objects pointed to by cross-reference table 310 is a "catalogue object" for the document. The catalogue object defines, among other things, the page structure of the document. A sample catalogue object is illustrated in detail in FIG. 4. Catalogue object 400 contains a number of sub-objects, which allow a user to navigate through the document in different ways. For example, an "article threads" object 402 contains one or more "threads" which link the document pages together in predetermined orders with each thread representing a different predetermined order.

An outline tree object 404 contains pointers to the various pages arranged in outline form. Similarly, a named destination sub-object 408 contains pointers to predetermined named locations in the document. For example, the named destination sub-object 408 may contain a pointer to the beginning of chapter 1 or a pointer to a particular location in the document body, etc. The named destination pointers allow a user to index directly to a particular point in the document.

A pages tree sub-object 406 contains a tree structure in which each page in the document is represented by a node, for example, one of nodes 410 and 412. Therefore, by "walking" the tree, a user can navigate from the beginning of the document to the node representing a particular page. Each page sub-object, for example, page sub-object 412, contains three further sub-objects which contain information associated with the particular page represented by the node. For example, the contents object 414 contains information about the content of the page. This may include, for example, the information in box 420 including the page data and object pointers to drawings or graphics located on the page and pointers to other resources, such as fonts, which are necessary to render the page.

In addition, each page sub-object contains a thumbnail object 416 which is a reduced-size page image that can be used in page indices or other page catalogs. Finally, an annotation sub-object 418 is included which contains any notes or annotations added to the page by the user. Annotations are not printed with the page data but are useful in describing the content of the page.

Figure 5:
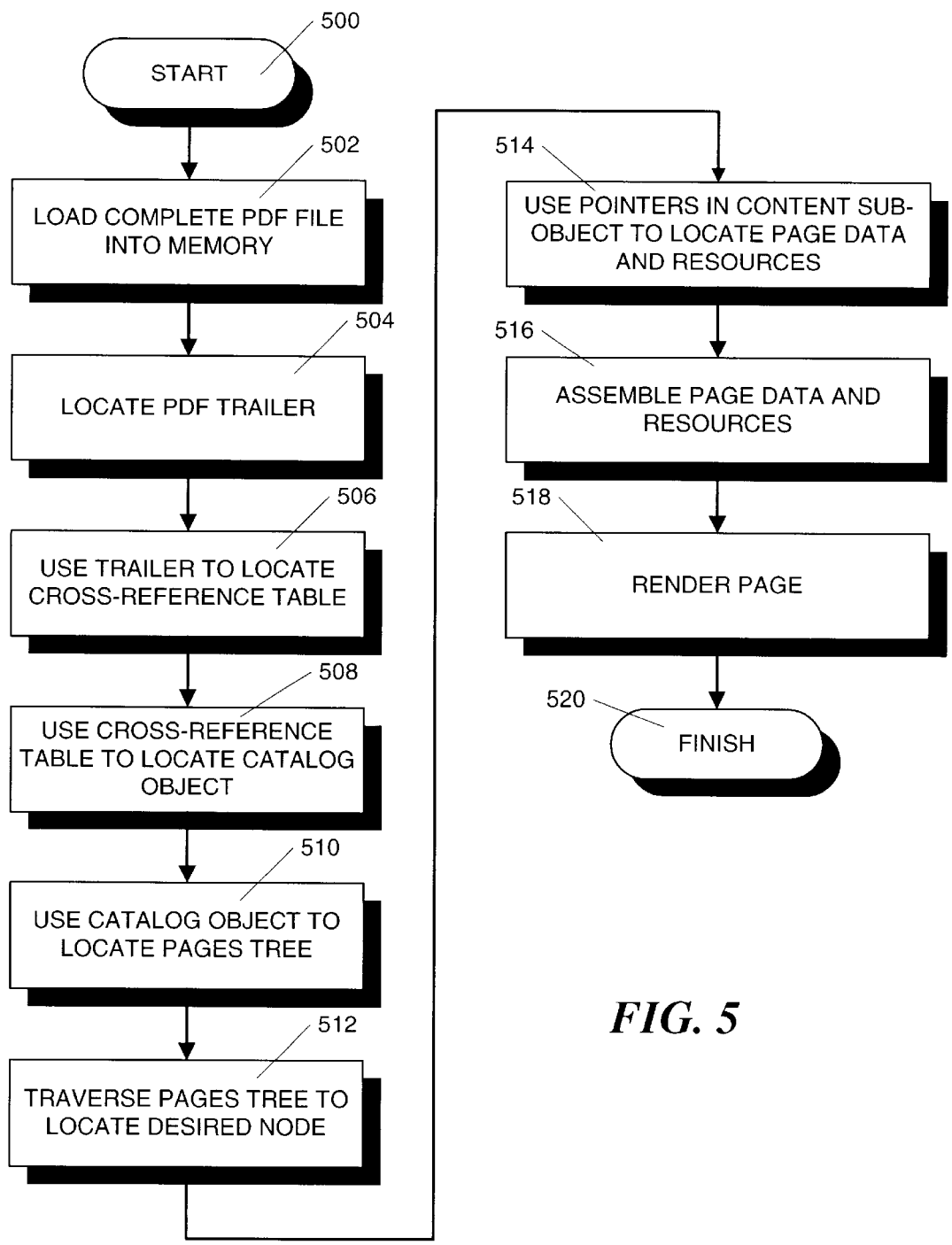
FIG. 5 is a flowchart generally showing the steps for viewing and printing pages in a PDF file.

Therefore, in order to display a page of a PDF file on a computer display screen, the display program must perform the subroutine shown in FIG. 5. This routine starts in step 500 and proceeds to step 502 where a complete PDF file is loaded into memory. Next, in step 504, the trailer at the end of the file is located. In step 506, the trailer is used to locate the beginning of the cross-reference table.

In step 508, the cross-reference table is used to locate the catalogue object and, in step 510, the pages tree object in the catalogue object is located. In step 512, the pages tree is traversed until the node representing the page to be displayed is located.

Finally, in step 514, the pointers in the content sub-object contained in the page node are used to locate the page data.

The resources required for the page are assembled in step 516 and the page data is rendered in step 518. The routine then finishes in step 520. The sequence shown in FIG. 5 is repeated for every page to be reviewed. This allows the pages to be accessed in random order with relative efficiency.

Figure 6:
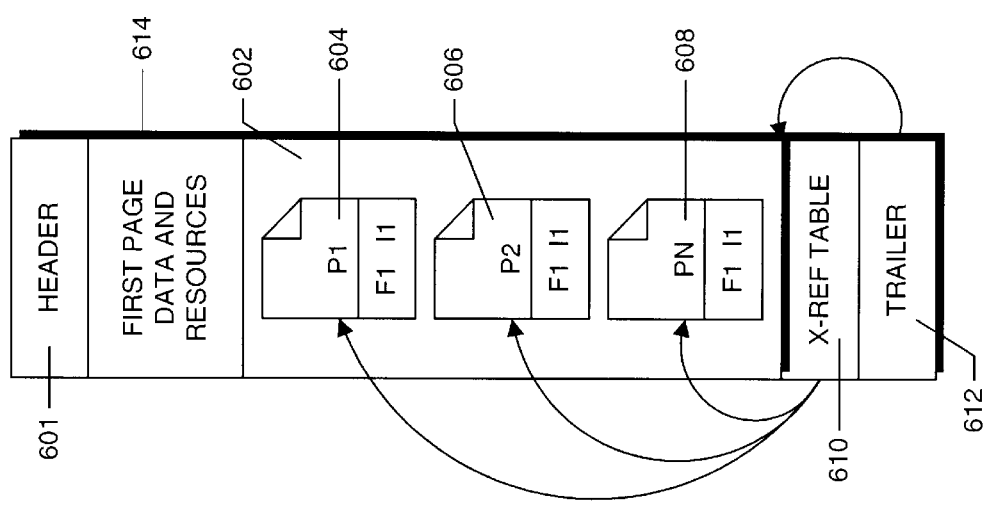
FIG. 6 is a schematic diagram illustrating the internal structure of a conventional linearized PDF file.

In order to avoid a potentially long delay which can occur during the loading of the entire PDF file in step 502, the PDF file format was modified to that shown in FIG. 6 where elements corresponding to elements in FIG. 4 have been given like designations. The format illustrated in FIG. 6 is called a "linearized page description format". In essence, the PDF format is modified so that all of the information required to render the first page is located at the front of the file as indicated at element 614. The remainder of the file is unchanged from the unmodified PDF format. Therefore, when the linearized page description format is used, the first page can be rendered while the rest of the file is being loaded.

Figure 7:
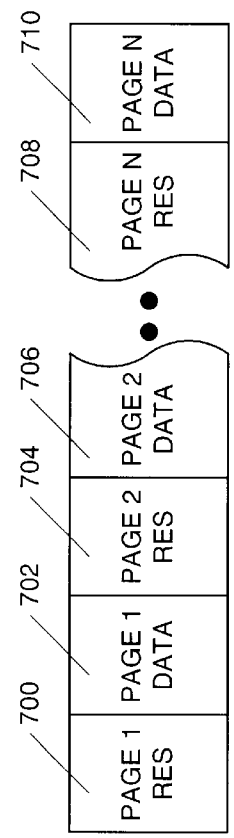
FIG. 7 is a schematic diagram of a typical print data stream used in a production printing system.

The problem with the PDF format and the linearized PDF format is that neither is well suited to the printing of pages in a high speed print production environment where rendering speed and recovery are critical, for example, in the system shown in FIG. 2. A high-speed production print data stream, which is required for such a system, is illustrated in FIG. 7. In particular, the print data stream must be constructed such that the printer can begin printing as soon as it receives data for the first page. The data stream must also be constructed so that the printer can continue printing page-by-page without ever needing to first process data located at the end of the data stream. Therefore, the data stream must contain the pages to be printed in strictly sequential order, with the data for each page including the resources, or references to the resources, required to print the data for that page. Since some printers can store resources, common resources need not be sent to the printer every time they are referenced. As shown in FIG. 7, such a data stream is continuous and consists of the resources 700 for page 1 (if not already loaded), followed by the data 702 for page 1. Next, the data stream consists of the resources 704 for page 2 (if not already loaded), followed by the page data 706 for page 2. The print data stream continues in this manner until the resources 708 for page N are transmitted, followed by the page data 710 for page N.

In addition, the print data stream must provide for full bi-directional "conversations" between the print server and the printer in order to facilitate resource management and error recovery. Such conversations can be used to track information, such as which resources are present in the printer, which pages have been received, and which pages have been printed and stacked. For example, the print data stream must be able to transmit commands from the print server to the printer and transmit acknowledgements generated by the printer to the print server. This conversational data stream allows the print server to manage the flow of data and resources, pausing to get an acknowledgement from the printer as required.

Acknowledgements generated by the printer can contain an indication that a print server command was received by the printer and is acceptable for processing and may include specific information requested from the printer by the print server. Negative acknowledgements generated by the printer indicate that some error occurred during printing. When this happens, the conversation between the printer and the print server provides for error recovery and resynchronization of the printing process between the printer and the print server.

Figure 8:
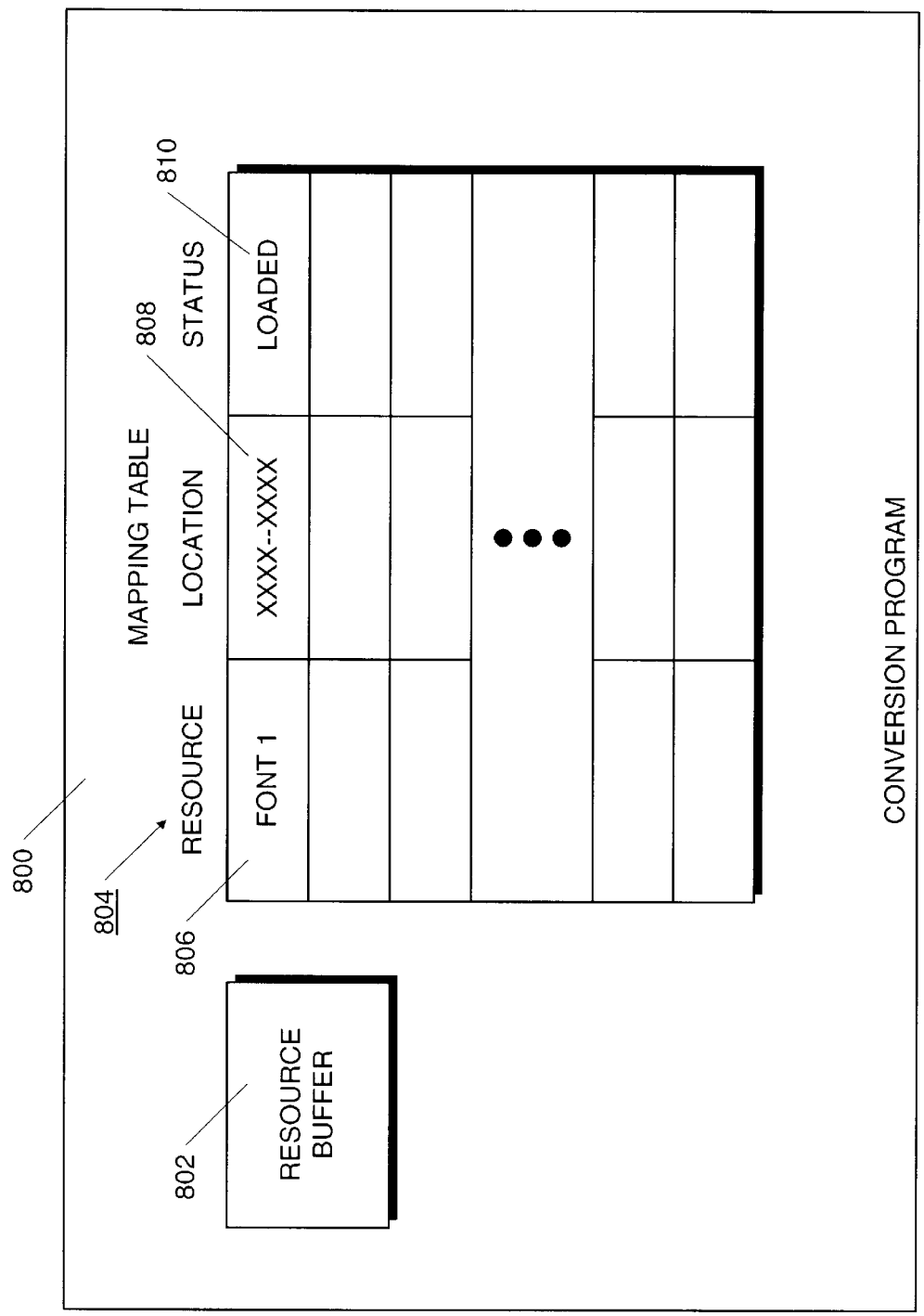
FIG. 8 is a schematic diagram illustrating the internal structure of a conversion program constructed in accordance with the principles of the present invention.

FIG. 8 illustrates, in more detail, the contents of a converter program for converting viewable format files into a high-speed production print stream in accordance with the principles of the present invention. In the description which follows PDF files are used as an illustration of a viewable file, but it will be apparent to those skilled in the art that other viewable format files can be converted into a production print stream in a similar manner using the method and apparatus of the present invention. The conversion program 800 includes a resource buffer 802, which is used to hold resource objects which have been newly-referenced on the page currently being processed. In particular, during processing of the page, all references to resource objects used on the page are identified and objects which have not been previously referenced on prior pages or the page currently being processed are inserted into buffer 802.

In order to determine which objects have already been sent to the printer, a structure, such as mapping table 804, is used. Mapping table 804 contains a record for each resource, which record includes the resource name 806, the resource location 808 and the resource status 810. For each object that is identified on the page, the mapping table is checked to see if the object has already been sent to the printer. If the object has already been sent to the printer, nothing further is done. If the object has not been sent, a data stream resource is constructed to send it.

Figure 9:
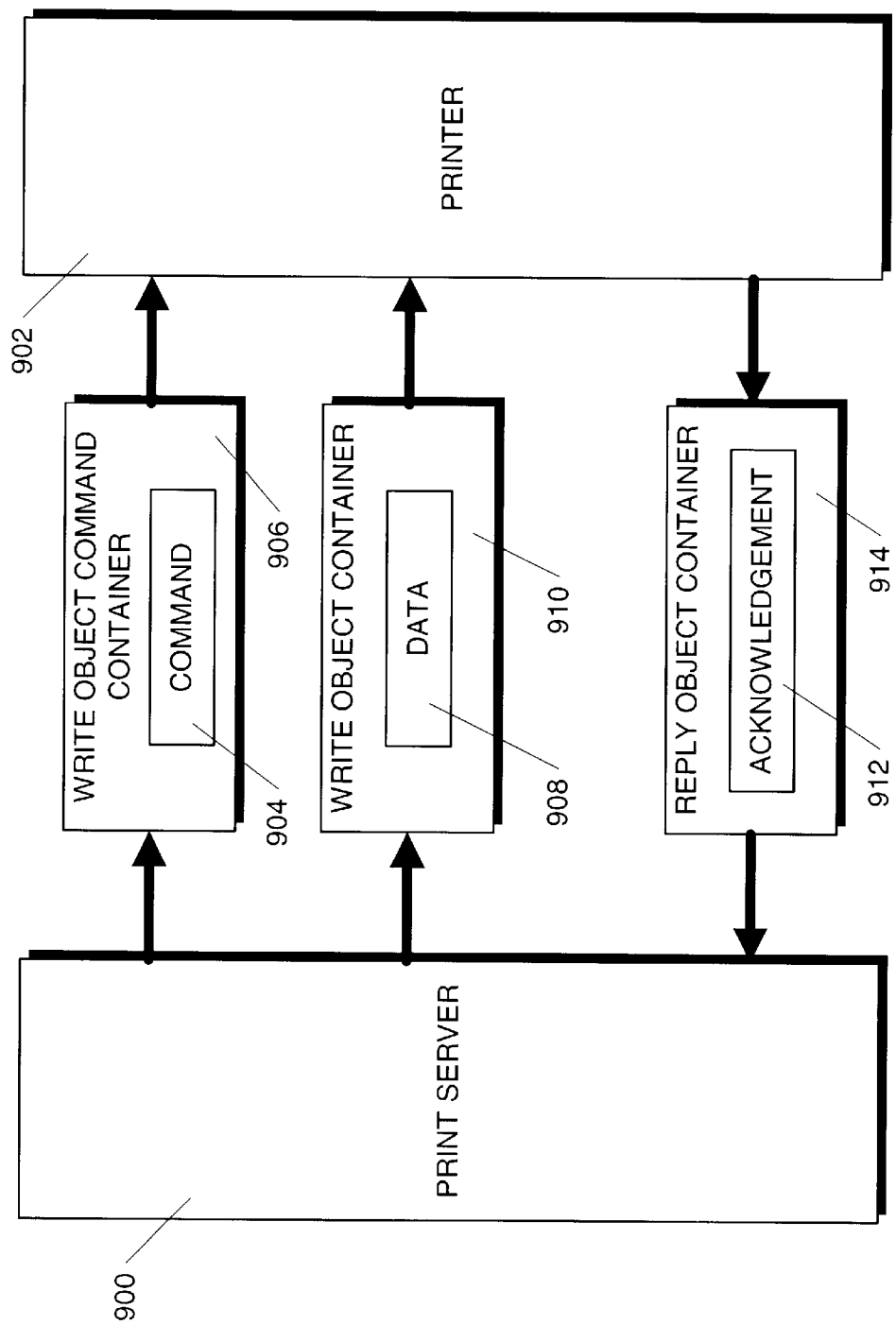
FIG. 9 is a schematic diagram illustrating a bi-directional data stream used in a AFP printing system.

Both the resources and the page data can be sent from the print server to the printer using a "containerized" data stream. For example, in the AFP production printing system described above, two types of containers are used to transmit information from the print server to the printer. One of these containers is called a "Write Object Command Container". This type of container contains commands and control information that are sent from the print server to the printer. Such an arrangement is illustrated in FIG. 9 where write object command container 906 carries a command object 904 from print server 900 to printer 902.

A similar type of object 910, called a "write object container", may be used to transfer PDF resource and data objects 908 from the print server 900 to the printer 902. When a container object is used, the underlying data stream is not sensitive to the type of data. The data stream simply carries the data in the container object from the print server to the printer. Similarly, an object called a reply object container, 914, can be used to convey acknowledgements and negative acknowledgements 912 from the printer 902 to the print server 900.

Figure 10A:
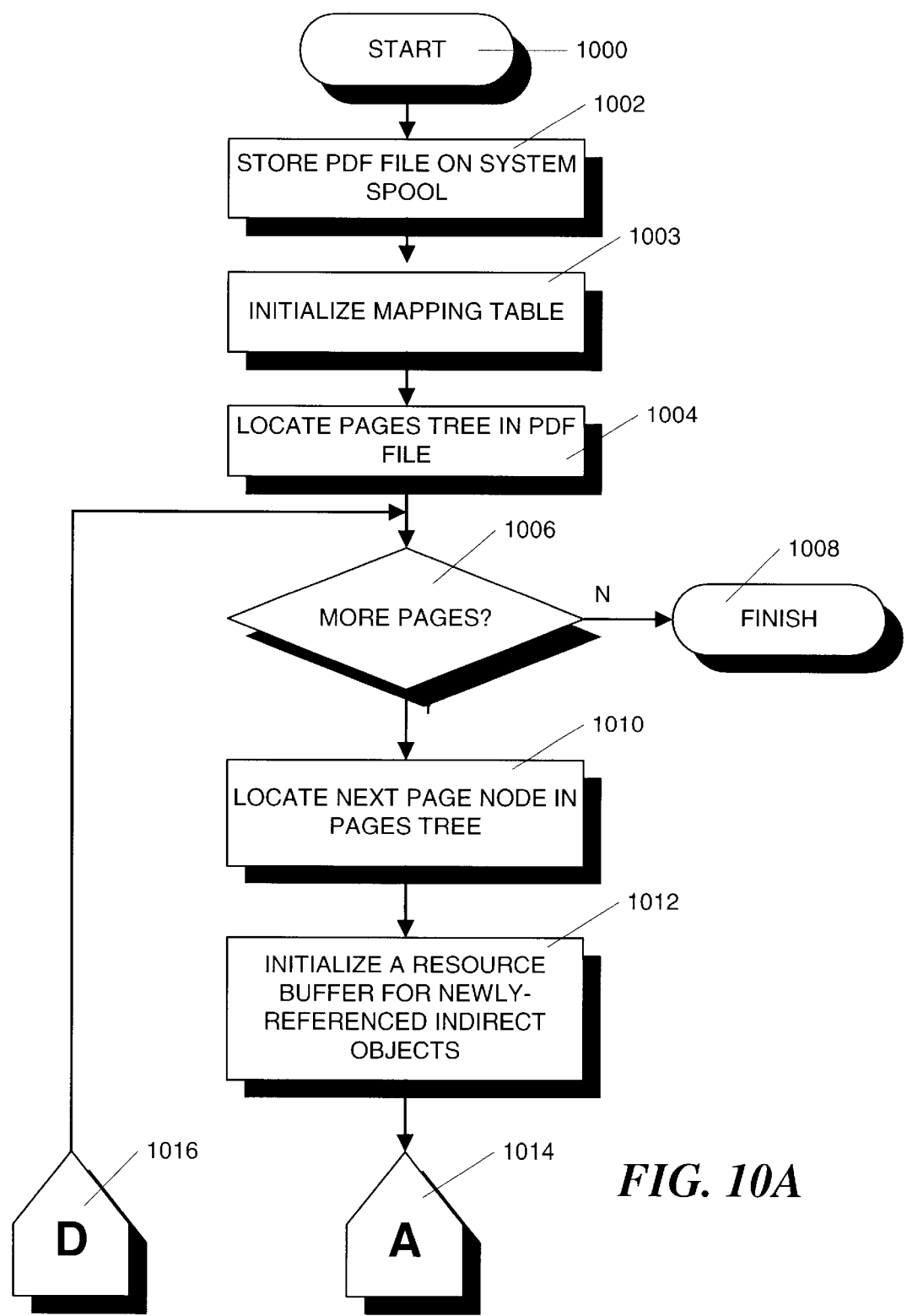
FIGS. 10A–10C, when placed together, form a flowchart which illustrates the steps involved in converting a viewable print object into a linearized production print stream in accordance with the principles of the invention.
Figure 10B:
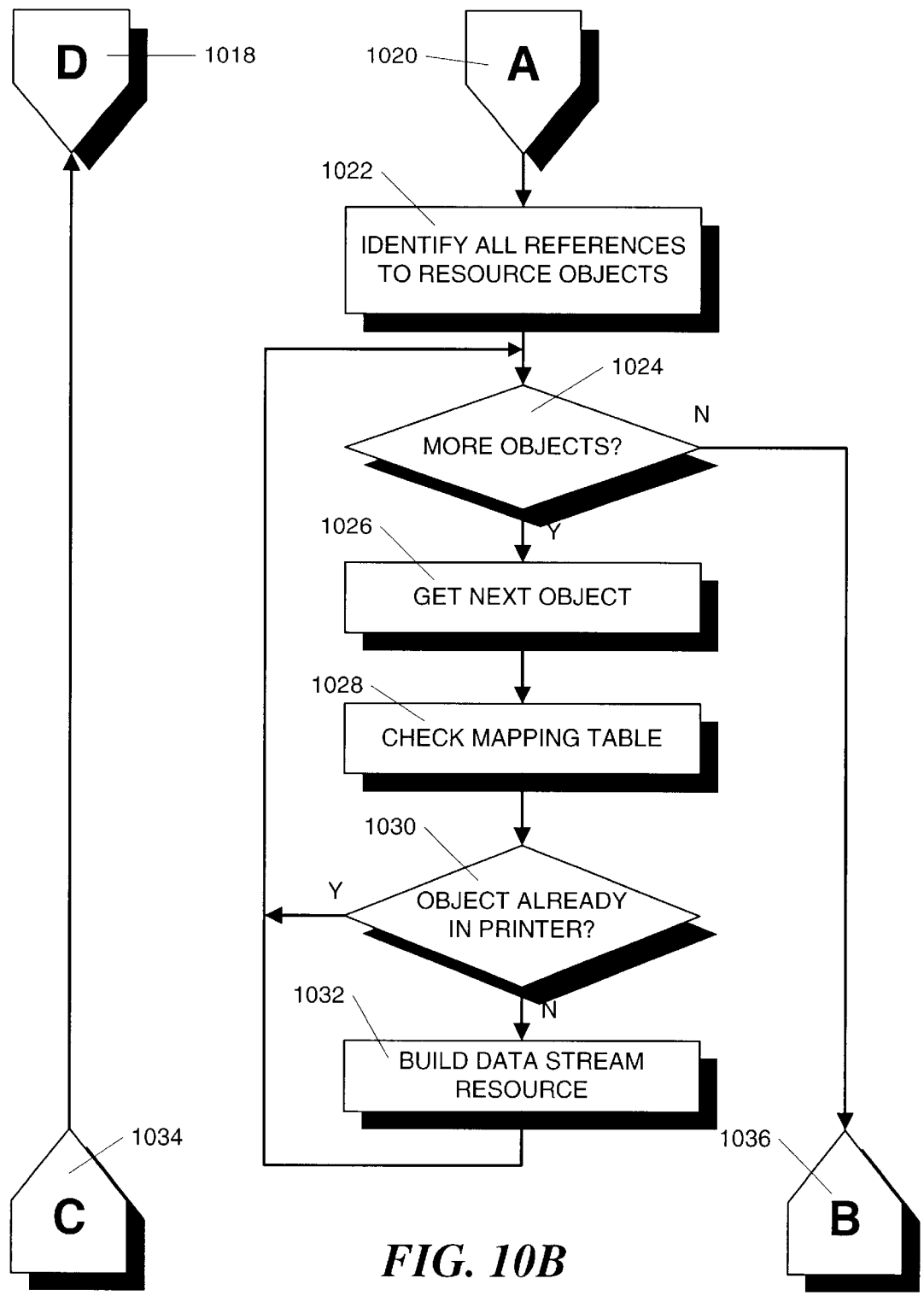
Figure 10C:
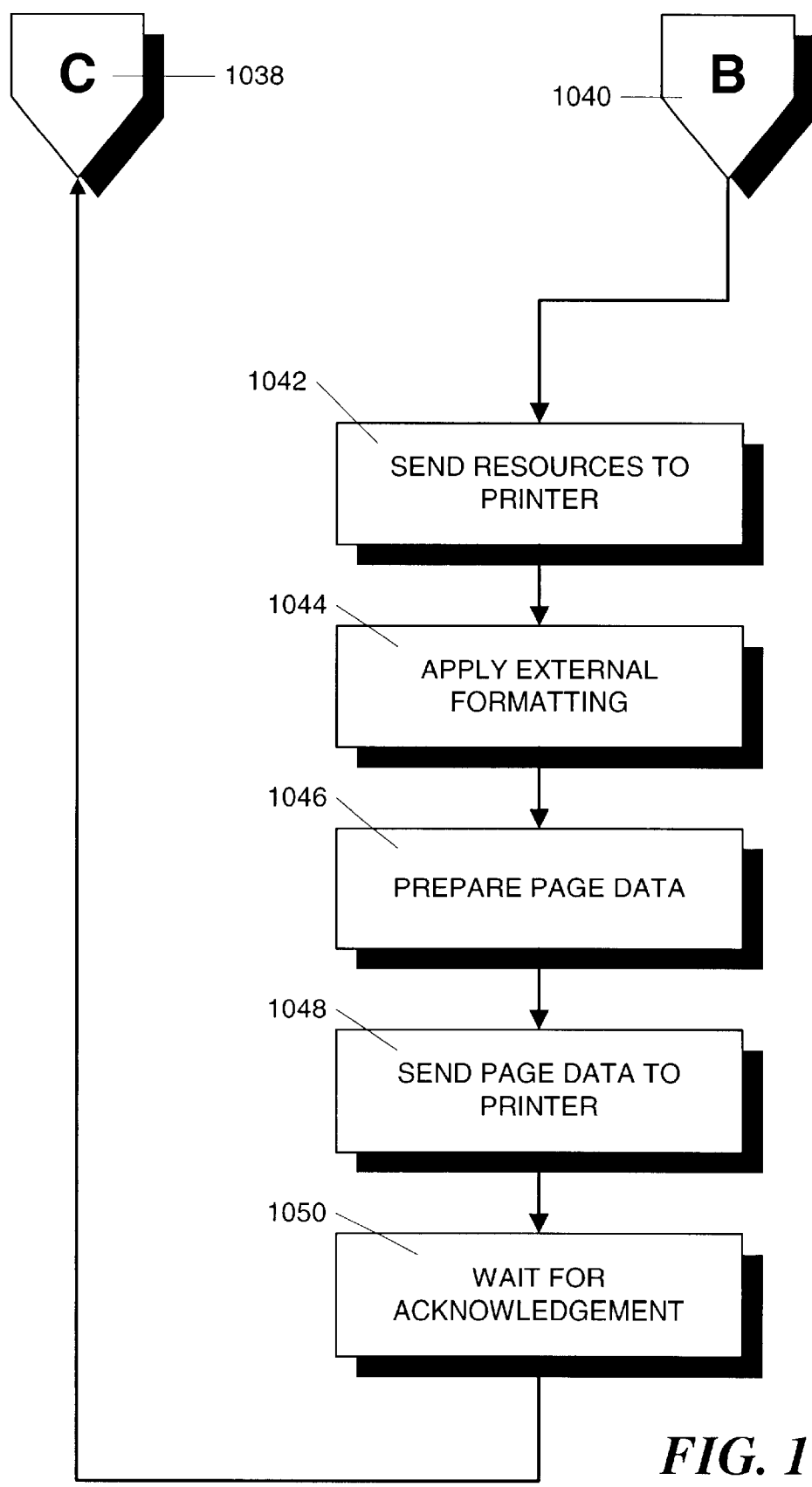

With such an arrangement, the steps involved in the processing of a file format, which has been structured for efficient viewing, such as a PDF format, into a bi-directional conversational print data stream (illustrated in FIG. 7) is shown in FIG. 10A–10C. In particular, the illustrated routine starts in step 1000 and proceeds to step 1002 in which a viewable file format, such as a PDF file (210) is stored in the spool 208.

Next, the mapping table 804 is initialized in step 1003. In step 1004, the pages tree 406 (FIG. 4) is located in the PDF file, for example, using the routine shown in FIG. 5. The pages tree will be traversed in page sequential order; in particular, at step 1006, a check is made to determine whether additional unprocessed pages remain. If no unprocessed pages remain, the routine finishes in step 1008.

However, if unprocessed pages remain, the next page node in the pages tree is located in step 1010. For each page, a resource buffer 802 is initialized in step 1012 to hold any newly-referenced resource object used on the page. The routine then proceeds, via off-page connectors 1014 and 1020 to step 1022. In step 1022, all references to indirect objects used on the page are identified.

Each object on the page is then processed. More particularly, in step 1024, a check is made to determine whether additional unprocessed objects remain. If unprocessed objects remain, the routine proceeds to step 1026 where the next object to process is obtained. The mapping table is then checked in step 1028 to determine whether the object has already been sent to the printer. This check is performed by reading the status value, 810, for the entry in the mapping table associated with the object.

In step 1030, a determination is made whether the object is already in the printer. If the object is not already in the printer, in step 1032, a data stream resource, such as a write object container, is constructed to send the resource from the print server to the printer. The routine then proceeds back to step 1024 to determine whether other objects remain to be processed. Alternatively, if, in step 1030, it is determined that the resource is already in the printer, then it need not be sent and the routine proceeds back to step 1024. Operation continues in this manner until containers are constructed for all resources that are required to render the page. The routine then proceeds to step 1042, via off-page connectors 1036 and 1040.

Next, in step 1042, the resources are sent to the printer by means of the data streams previously constructed. External formatting defined for this page is then applied in step 1044. This external formatting may be stored, for example, in a format control file, 212 and the spool 208. Next, in step 1046, the page data is prepared for printing. In step 1048, the page data is sent to the printer using a write object command container, plus a write object container. Finally, in step 1050, the process waits for an acknowledgement (if required.) For efficiency, acknowledgements can be requested at preset page intervals. The routine then proceeds back to step 1006 (via off-page connectors 1038, 1034, 1018 and 1016) to process any further pages.

A software implementation of the above-described embodiment may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that the disclosed method and apparatus for converting viewable file formats into a production printing stream can be extended from the disclosed PDF objects to other viewable objects, such as HTML files. Further, the methods of the invention may be achieved in either all software implementations, using the appropriate processor instructions, or in hybrid implementations which utilize a combination of hardware logic and software logic to achieve the same results. In addition, aspects such as the size of memory, the specific configuration of logic and/or instructions utilized to achieve a particular function, as well as other modifications to the inventive concept are intended to be covered by the appended claims.

What is claimed is:

1. Apparatus for converting a viewable page description file having a format structured for random access of pages into a linearized stream of page data for printing on a printer having storage associated with it, the apparatus comprising:

a decomposing program which reads the page description file and generates sequential references to each of the pages therein;

a mechanism for identifying print data and resource objects referenced on each page;

a first transport program which generates a first data stream for transporting objects to the printer, the first transport program generating the first data stream only for resource objects which are not already stored in the printer storage;

a mechanism for obtaining each resource object and assembling resource objects and print data for each page; and a mechanism for sending the assembled resource objects and print data to the printer by placing the assembled resource objects and print data on the data stream.

2. Apparatus according to claim 1 wherein the transport program has a mapping table stored therein and the transport program comprises a mechanism for examining the mapping table to determine which resource objects are stored in the printer storage.

3. Apparatus according to claim 1 further comprising a second transport program which generates a second data stream for transmitting acknowledgements from the printer to the apparatus.

4. Apparatus according to claim 3 wherein the first and second data streams comprise a conversational, bi-directional data stream between the apparatus and the printer.

5. Apparatus according to claim 1 wherein the first transport program comprises a mechanism which inserts page identification information into the first data stream.

6. Apparatus according to claim 5 wherein the mechanism comprises a container object which holds the page identification information.

7. Apparatus according to claim 1 further comprising a second transport program which generates a second data stream for transmitting reply objects which carry information from the printer to the apparatus.

8. Apparatus according to claim 7 wherein the first and second transport program are part of an IPDS intelligent printing system.

9. Apparatus according to claim 8 wherein the mechanism comprises a write container object which holds the page identification information.

10. Apparatus according to claim 1 wherein the viewable page description file comprises a PDF file.

11. A method for converting a viewable page description file having a format structured for random access of pages into a linearized stream of page data for printing on a printer having storage associated with it the method comprising the steps of:

(a) reading the page description file and generating sequential references to each of the pages therein;

(b) identifying print data and resource objects referenced on each page;

(c) generating a first data stream for transporting objects to the printer, comprising generating a data stream only for resource objects which are not already stored in the printer storage;

(d) obtaining each resource object and assembling resource objects and print data for each page; and (e) sending the assembled resource objects and print data to the printer by placing the assembled resource objects and print data on the data stream.

12. A method according to claim 11 wherein the transport program has a mapping table stored therein and step (c) comprises the step of:

(c1) examining the mapping table to determine which resource objects are stored in the printer storage.

13. A method according to claim 11 wherein the method operates in a print server and further comprises the step of:

(f) generating a second data stream for transmitting acknowledgements from the printer to the print server.

14. A method according to claim 13 wherein the first and second data streams comprise a conversational, bi-directional data stream between the print server and the printer.

15. A method according to claim 11 wherein step (c) comprises the step of:

(c2) inserting page identification information into the first data stream.

16. A method according to claim 15 wherein step (c) comprises the step of:

(c3) creating a container object to hold the page identification information.

17. A method according to claim 11 wherein the method operates in a print server and further comprises the step of:

(g) generating a second data stream for transmitting reply objects which carry information from the printer to the print server.

18. A method according to claim 17 wherein the first and second transport program are part of an IPDS intelligent printing system.

19. A method according to claim 18 wherein step (c) comprises the step of:

(c4) using a write container object to hold the page identification information.

20. A method according to claim 11 wherein the viewable page description file comprises a PDF file.

21. A computer program product for converting a viewable page description file having a format structured for random access of pages into a linearized stream of page data for printing on a printer having storage associated with it, the computer program product comprising a computer usable medium having computer readable program code thereon, including:

program code which reads the page description file and generates sequential references to each of the pages therein;

program code which identifies print data and resource objects referenced on each page;

program code which generates a first data stream for transporting objects to the printer and comprises program code for generating a data stream only for resource objects which are not already stored in the printer storage;

program code which obtains each resource object and assembles page resource objects and print data for each page; and program code which sends the assembled page resources and print data to the printer by placing the assembled resource objects and print data on the data stream.

22. A computer program product according to claim 21 wherein the transport program has a mapping table stored therein and wherein the program code which generates a first data stream comprises program code for examining the mapping table to determine which resource objects are stored in the printer storage.

23. A computer program product according to claim 21 wherein the computer program product runs in a print server and the further comprises program code for generating a second data stream which transmits acknowledgements from the printer to the print server.

24. A computer program product according to claim 23 wherein the first and second data streams comprise a conversational, bi-directional data stream between the print server and the printer.

25. A computer program product according to claim 21 wherein the program code which generates a first data stream comprises program code for inserting page identification information into the first data stream.

26. A computer program product according to claim 25 wherein the program code which generates a first data stream comprises program code for creating a container object to hold the page identification information.

27. A computer program product according to claim 21 wherein the computer program product runs in a print server and further comprises program code for generating a second data stream for transmitting reply objects which carry information from the printer to the print server.

28. A computer program product according to claim 27 wherein the first and second transport program are part of an IPDS intelligent printing system.

29. A computer program product according to claim 28 wherein the program code which generates a first data stream comprises program code for using a write container object to hold the page identification information.

30. A computer program product according to claim 21 wherein the viewable page description file comprises a PDF file.

* * * * *